United States Patent
Auxerre

(10) Patent No.: US 6,591,883 B2
(45) Date of Patent: Jul. 15, 2003

(54) REINFORCED BEAD FOR A RADIAL TIRE

(75) Inventor: Pascal Auxerre, Royat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 164 days.

(21) Appl. No.: 09/767,573

(22) Filed: Jan. 23, 2001

(65) Prior Publication Data

US 2001/0018941 A1 Sep. 6, 2001

Related U.S. Application Data

(63) Continuation of application No. PCT/EP99/04877, filed on Jul. 12, 1999.

(30) Foreign Application Priority Data

Jul. 23, 1998 (FR) .............................. 98 09451

(51) Int. Cl.$^7$ .......................... B60C 15/00; B60C 15/06
(52) U.S. Cl. ...................... 152/542; 152/539; 152/543; 152/546; 152/548; 152/554
(58) Field of Search .................. 152/542, 543, 152/548, 558, 560, 546, 539, 554

(56) References Cited

FOREIGN PATENT DOCUMENTS

| FR | 2776238 | 9/1999 |
|----|---------|--------|
| GB | 2035228 | 6/1980 |
| GB | 1589324 | 5/1981 |

OTHER PUBLICATIONS

U.S. patent application Ser. No. 09/665,468, filed Sep. 20, 2000, "Reinforcing Tire Bead for a Radial Tire," by Patrick Corsi.

U.S. patent application Ser. No. 09/887,317, filed Jun. 22, 2001, "Bead for a Radial Tire," by Pascal Auxerre.

Primary Examiner—Adrienne C. Johnstone
(74) Attorney, Agent, or Firm—Baker Botts L.L.P.

(57) ABSTRACT

A tire for heavy loads, having an inextensible radial carcass ply anchored to a bead wire to form an upturn, the end of which is located at a radial distance from the base of the bead. Each bead is reinforced by at least two additional reinforcement armatures, one armature formed of radial inextensible metallic reinforcement elements and a second armature formed of metallic elements forming an angle with the circumferential direction, the first armature being formed of at least one ply wound around the anchoring bead wire on the inside of the carcass reinforcement to form two strands, such that the axially inner strand, between the radially lower end of its radially upper edge parallel to the meridian profile of the carcass reinforcement and its point of tangency with the anchoring bead wire, follows a rectilinear trace referred to as "shortest-path".

7 Claims, 3 Drawing Sheets

REINFORCED BEAD FOR A RADIAL TIRE

BACKGROUND OF THE INVENTION

This is a continuation of PCT/EP99/04877, filed Jul. 12, 1999.

The present invention relates to a tire with radial carcass reinforcement, and more particularly to a "heavy-vehicle" tire, intended to be fitted on vehicles such as lorries, road tractors, buses, trailers and others, and in which a novel reinforcement structure for the beads is adapted in order to improve the life of said beads.

Generally, a tire of the type in question comprises a carcass reinforcement formed of at least one ply of metal cables which is anchored in each bead to at least one bead wire, forming an upturn. The carcass reinforcement is radially surmounted by a crown reinforcement, composed of at least two plies of metal cables which are crossed from one ply to the next, forming angles of between 10° and 45° with the circumferential direction. The carcass reinforcement upturns are generally reinforced by at least one ply of metal cables oriented at a small angle relative to the circumferential direction.

In the case of the presence of a single bead reinforcement ply, the latter may be located along the carcass reinforcement upturn with a radially upper end located above or below the radially upper end of the carcass reinforcement upturn. As for the radially lower end of such a ply, it is generally located either on a straight line parallel to the axis of rotation and passing approximately through the center of gravity of the meridian section of the anchoring bead wire of the carcass reinforcement, in the case of a tire having beads intended to be mounted on rim seats inclined at 15°±2°, or on a straight line parallel to the axis of rotation and passing through a point located between the center of gravity of the meridian section of the anchoring bead wire and the point of maximum axial width of the carcass reinforcement, in the case of a tire having beads intended to be mounted on rim seats inclined at 0° or at 5°±1°. In this second case, the reinforcement ply of the bead is then wound around the bead wire, so as to have an axially outer strand and an axially inner strand, the radially upper end of the axially inner strand being generally located beneath the radially upper end of the axially outer strand.

The known solution aims to avoid deradialization of the cables of the carcass reinforcement upturn and to minimize the radial and circumferential deformations to which the end of said upturn and the outer rubber layer covering the bead and providing the connection to the rim are subjected.

In other cases, the metallic reinforcement ply has been replaced by a plurality of plies, textile ones, for example, located axially either on the same side of the upturn or on either side of said upturn, or alternatively partially along the upturn and partially along the carcass reinforcement. Another variant consists in placing two reinforcing plies along the upturn, on either side of said upturn, and a third ply along the carcass reinforcement axially to the outside of said reinforcement.

The life of "heavy-vehicle" tires, owing to the progress achieved, and to the fact that certain types of travel are made less of a handicap as far as wear of the tread is concerned, has become such that it is also necessary to improve the life of the beads, and more particularly of tires subject to prolonged travel, this travel frequently inducing a high temperature of the beads owing to the temperatures reached by the mounting rims.

In order to improve the life of a tire required to bear heavy loads and having beads intended to be mounted on flat rim seats or rim seats inclined at 5°, FR 2 356 528 proposes arranging on the inside of the carcass reinforcement and its upturn a reinforcement armature of radial metal elements having a great elongation, said armature being wound around the bead wire to form two strands, the axially outer strand having one end radially above, on one hand, the upturn of the carcass reinforcement and, on the other hand, the upper end of a second reinforcement armature of elements which are oriented at a certain angle relative to the circumferential direction.

To the same end, French Application FR 2 776 238 proposes, contrary to the above teaching, a tire comprising at least one radial carcass reinforcement, formed of at least one ply of inextensible reinforcement elements and anchored in each bead to a bead wire to form an upturn, the end of which is located at a radial distance Hi[]c from the base of the bead, each bead being reinforced by at least two additional reinforcement armatures, at least one first armature formed of radial metallic reinforcement elements and at least one second armature formed of elements forming an angle α with the circumferential direction such that $0° \leq \alpha \leq 45°$, characterized in that, viewed in meridian section, the first reinforcement armature formed of radial metallic elements is wound around the anchoring bead wire of the carcass reinforcement on the outside of said carcass reinforcement to form two strands, such that the radially upper end of the axially outer strand is radially located at a distance HLE from the base of the bead of between 65% and 95% of the distance $H_{RNC}$, the second armature not being wound around said anchoring bead wire.

The carcass reinforcement of the radial tire as described above, mounted on its operating rim and inflated to the recommended pressure, has in one sidewall a regularly convex meridian profile between approximately the zones of connection with the meridian profile of the crown reinforcement and with the bead. In particular, starting from the radius where the carcass reinforcement is subject to the influence of the bead reinforcement ply (plies) having reinforcement elements which are inclined relative to the radial direction, said reinforcement has in the bead a concave meridian profile, substantially curved in the opposite direction to the curvature in the sidewalls, that is to say, substantially parallel to the curvature of the rim flanges from a point of inflection located radially approximately at the level of the radially upper end of the bead reinforcement ply having inclined elements, which is placed axially to the outside along the carcass reinforcement upturn. Generally, the meridian profile of any bead reinforcement armature, located axially to the inside or to the outside of the non-upturned part of the carcass reinforcement, is substantially parallel to the meridian profile of said non-upturned part.

SUMMARY OF THE INVENTION

Studies and tests have resulted in improvements in the life of said tire, having beads intended to be mounted on flat rim seats or rim seats inclined at 5°, by using differently the bead reinforcement armature having radial elements. The tire of height H on rim, according to the invention, and comprising at least one radial carcass reinforcement, formed of at least one ply of inextensible reinforcement elements and anchored in each bead B to a bead wire to form an upturn, the end of which is located at a radial distance $H_{RNC}$ from the base D of the bead wire, each bead B being reinforced by at least two additional reinforcement armatures, at least one first armature formed of radial metallic reinforcement elements and at least one second armature formed of metallic elements which form with the circumferential direction an angle α such that 0°≦α≦45°, is characterized in that, viewed in meridian section, the first reinforcement armature is formed of at least one ply of inextensible elements which is wound around the anchoring bead wire of the carcass reinforcement on the inside of said carcass reinforcement to form two strands, such that the axially inner strand, between the radially lower end A of its radially upper edge adjacent to the carcass reinforcement and its point of tangency T to the anchoring bead wire, follows a rectilinear trace AT referred to as "shortest-path", and that the radially upper end of said axially inner strand is radially located at a distance $H_{LI}$ from the base of the bead wire D of between 0.216 and 0.432 times the height H, the axially outer strand which is located axially to the inside of the upturn of the carcass reinforcement having its radially upper end radially closer to the axis of rotation than the end of the carcass reinforcement upturn and the distance $H_{LE}$ between said end of the base D of the bead wire being between 0.2 and 0.8 times the height $H_{RNC}$ of the upturn of the carcass reinforcement, the second armature of elements inclined relative to the radial direction not being wound around said anchoring bead wire and arranged axially to the outside of the upturn of the carcass reinforcement.

"Rectilinear trace" is to be understood to mean a trace which may differ slightly from a straight line, and in the case of tires to which the invention relates the trace of the axially inner strand of the ply of radial reinforcement elements of the bead will also be said to be rectilinear if it is curved, concave or convex, having a deflection relative to the straight line of at most 2 mm.

The radial reinforcement elements of the first ply of the bead reinforcement armature are preferably inextensible metallic elements, made of steel and in the form of cables.

It is advantageous, in order to improve the resistance of the carcass reinforcement to rupture of reinforcement elements occurring in its portions which form an integral part of the beads, to impart to said portions the same profile as that of the bead reinforcement plies having radial elements, that is to say, a rectilinear profile.

In order to promote the taking-up of the meridian stresses of the carcass reinforcement upturn, and thus to improve the resistance to the initiation and propagation of cracks in rubber which start at the end of the carcass reinforcement upturn, it is particularly advantageous to add to the first reinforcement ply of radial elements a second ply of said elements. In this case, the first ply of elements, the two strands of which are axially located between the carcass ply and its upturn, will have the radially upper end of the axially outer strand very close to the anchoring bead wire and the distance between said end and the base of the bead will be less than the height of the rim flange on which the tire will be mounted. As for the second ply, it will be wound around the anchoring bead wire on the outside of the carcass ply and its upturn, so as to form two strands, the end of the axially outer strand being distant from the base of the bead by a distance $H_{LE2}$ of between 0.4 and 1.2 times the distance $H_{RNC}$, and the end of the axially inner strand $H_{LI2}$ being distant from said bead wire base by a quantity less than the height of the rim flange. Since said second reinforcement ply is located axially to the outside of the concave carcass upturn, it will also preferably have a shortest-path trace, but without necessarily being rectilinear. As in the case of the first ply, the reinforcement elements of the second ply are inextensible metallic elements, and preferably steel cables, the best results being obtained by using steel cables in all the plies present in the bead.

The details of the invention will be better understood with reference to the following description, which refers to the drawings, which illustrate examples of embodiments in non-limitative manner.

DESCRIPTION OF PREFERRED EMBODIMENTS

Figure 1:
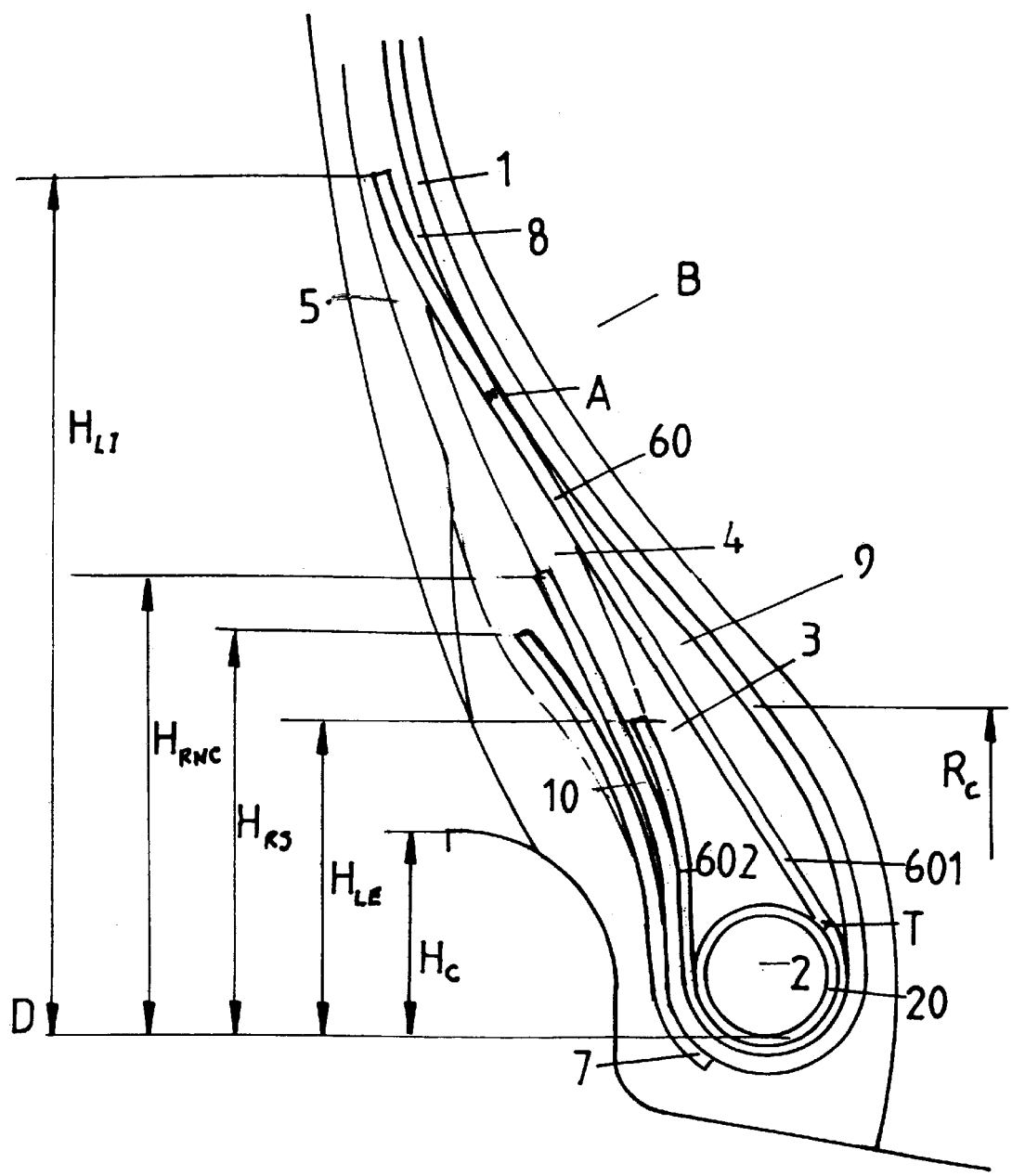
FIG. 1 is a diagram of a first variant of a bead according to the invention.

The bead B shown in FIG. 1 is that of a D 20 X tire, intended to be mounted on a rim comprising rim seats inclined at 5°. Said bead is reinforced by a bead wire 2. Around said bead wire 2 there is anchored a carcass reinforcement 1 composed of a single ply of metal cables. The anchoring is effected by an upturn 10 around the layer 20 of rubber mix which covers the bead wire 2, and the radial distance $H_{RNC}$ between the radially upper end of said upturn 10 and the base D (said base being represented by convention by the straight line parallel to the axis of rotation passing through that point of the bead wire 2 closest to said axis of rotation) being equal, in the example in question of the tire of dimension D 20 X, to 0.27 times the height H of the tire on its rim, the latter being the radial distance between the point of the tire which is radially farthest from the axis of rotation and the straight line for measuring the nominal diameter of the mounting rim, and equal to 268 mm. Between the carcass reinforcement 1 and its upturn 10, radially above the bead wire 2, there is arranged a first bead filler 3 of rubber mix of a generally high Shore A hardness, said first filler 3 being extended radially by a second filler 4 of rubber mix of a lower Shore hardness than the previous one and the radially upper end of said filler 4 being substantially located at the level of the maximum axial width of the tire.

The carcass reinforcement 1 of the tire, mounted on its operating rim and inflated to the recommended pressure, has in one sidewall a regularly convex meridian profile between approximately the zones of connection to the meridian profile of the crown reinforcement (not shown) and to the bead B. In particular, starting from the inflection point of radius $R_C$, located radially approximately at the level of the radially upper end of the conventional bead reinforcement ply 7 placed along the carcass reinforcement upturn and where the carcass reinforcement is under the influence of said bead reinforcement ply 7, said carcass reinforcement has a concave meridian profile, curved in the opposite direction to the curve in the sidewalls, that is to say, substantially parallel to the curvature of the rim flanges starting from said inflection point.

Axially to the outside of the non-upturned part of the carcass ply 1 and, after turning up around the bead wire 2, axially to the inside of the upturn 10 of the ply 1, there is arranged a first bead reinforcement armature 6 composed, in the example described, of a single ply 60, so as to form two strands, an axially inner strand 601 and an axially outer strand 602. The radially upper ends of the two strands 601 and 602 respectively are located relative to the base of the bead at heights $H_{LI}$ and $H_{LE}$, respectively, equal to 86 mm and 38 mm, the distance $H_{LE}$ being equal to 65% of the distance $H_{RNC}$. The ply 60 of said first armature is formed of radial metal cords or cables, in the example described oriented at 90° to the circumferential direction (reinforcement elements forming an angle within the range −85°, +85° with the circumferential direction will be considered to be radial). The two ends respectively of the upturn of the carcass reinforcement and of the axially outer strand of the reinforcement ply 60 are covered axially to the outside by a third filler 5, referred to as an "infill filler" and bearing firstly on the second bead filler 4 and on the parts of the plies 601 and 10. The edge of the axially inner strand 601 of said ply 60, and "edge" of a reinforcement ply is to be understood to mean a part of said ply having, starting from its end, a length of at least 15 mm, is axially substantially parallel to the non-upturned part of the carcass ply 1, while being decoupled from said part by a layer of rubber mix 8. Radially to the inside, said edge is extended by a rectilinear portion, firstly tangent at A to the meridian profile of said edge, then parallel over a very short distance to the convex meridian profile of the carcass ply 1 and secondly tangent at T to the outer contour of the coated bead wire 2. Between the carcass reinforcement 1 and said rectilinear portion, there is placed a filler profile 9 of rubber mix.

As for the second bead reinforcement armature 7, it is formed, in the example described, of a ply 7 of inextensible metal cables made of steel which are parallel to each other in the ply and form an angle of 22° with the circumferential direction, said ply 7 being located axially to the outside of the carcass reinforcement upturn and having firstly a radially upper end located at a distance HRS from the base D which is equal to 50 mm, that is to say, radially above the end of the axially outer strand 602 of the ply 60 of the first bead reinforcement armature 6, and a radially lower end practically located at the level of the base of the bead.

Figure 2:
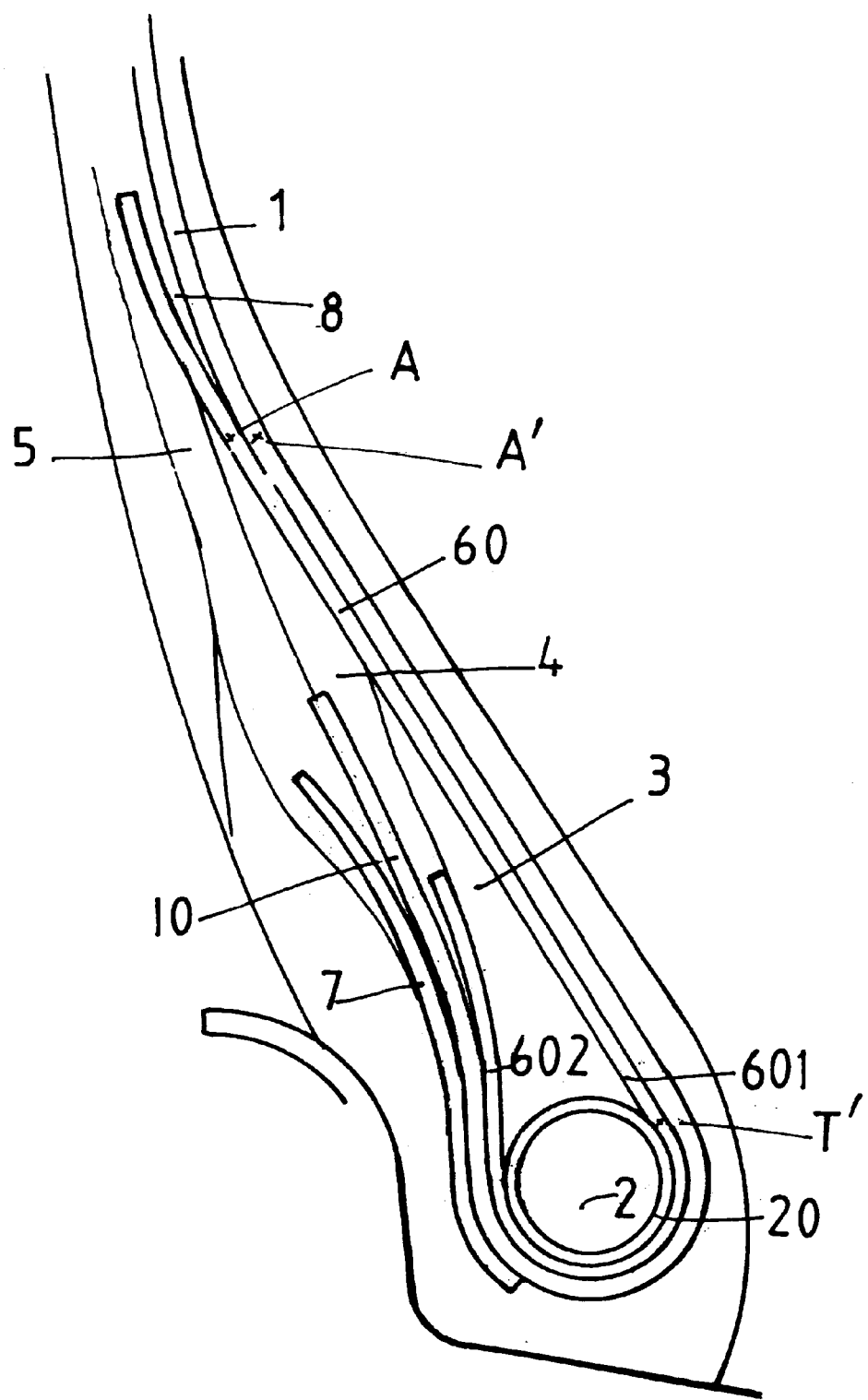
FIG. 2 is a diagram of a second variant of a bead according to the invention, the bead being thinned overall.

The variant illustrated in FIG. 2 relates to the meridian profile of the carcass reinforcement 1, and more particularly to the profile in the bead of the tire: starting from the point A' located on the same straight line parallel to the axis of rotation as the point A described previously, said reinforcement has a meridian profile, the trace of which, viewed in cross-section, is parallel to the trace of the rectilinear portion of the axially inner strand of the reinforcement ply 60, said trace becoming a tangent to the bead wire 2 at T'. Said variant permits well-known thinning of the bead, which results in a lower operating temperature with all the favorable results with regard to the fatigue strength of such a bead, and in a considerable reduction in weight of the tire.

As in the case of the example illustrated in FIG. 1, the structure of the bead B is completed by the presence of a second bead reinforcement armature 7, also formed of a ply 7 of inextensible metal cables made of steel which are parallel to each other in the ply and form an angle of 22° with the circumferential direction, said ply 7 being located axially to the outside of the carcass reinforcement upturn and having radially upper and radially lower ends located as in the case of FIG. 1.

Figure 3:
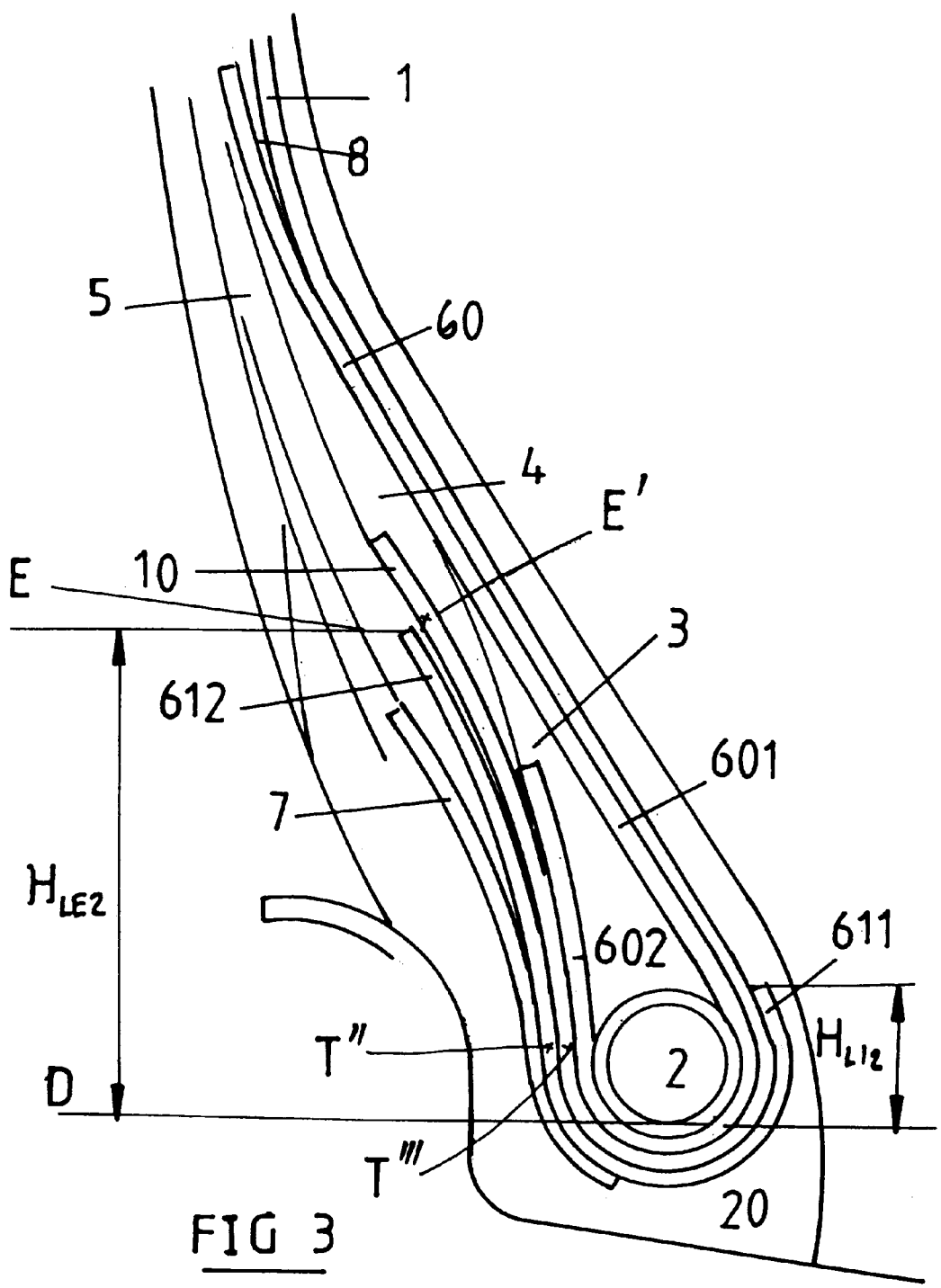
FIG. 3 is a diagram of a third preferred variant of the invention.

The third variant, illustrated in FIG. 3, is directly derived from that described above and illustrated in FIG. 2. It differs therefrom fundamentally in the presence of a second ply 61 of the reinforcement armature 6, composed of radial metallic reinforcement elements and wound around the bead wire 2 to form two strands: an axially outer strand 612, located axially to the outside of the upturn 10 of the carcass reinforcement 1 and the radially upper end of which is located at a radial distance $H_{LE2}$ from the base of the bead of 58 mm, or 0.78 times the height $H_{RNC}$ of said upturn 10, and an axially inner strand 611, located axially to the inside of the non-upturned part of the carcass ply and the radially upper end of which is located at a radial distance $H_{LI2}$ from the base of the bead which is less than the height $H_C$ of the rim flange on which the tire will be mounted. The profile of the axially outer strand of said second ply 61 of the bead reinforcement armature 6 has a trace which is not necessarily parallel to the trace of the meridian profile of the upturn 10 of the carcass ply 1, said trace of the strand 612 being said to be "shortest-path" within the limits of possibility, since said trace cannot in all cases be rectilinear owing to the presence of a rim flange. In the case of the axially outer strand of a reinforcement ply, this "shortest-path" trace is defined as being a trace which, between its upper end E and its point of tangency T''' with the circle parallel to the circle circumscribed on the bead wire 2, has a length less than the length of the trace of the carcass upturn 10, between the point of said upturn E' located on the straight line perpendicular to the meridian profile of the carcass reinforcement upturn lowered by E and the point of tangency T''' of said upturn with the bead wire, T''' being located on the same straight line parallel to the axis of rotation as the point T''. It is obvious that this trace may be parallel to the trace of the carcass ply upturn, and will always have a shorter path relative to said upturn trace, since it is within the circle representing the concave curvature of the trace of the upturn, owing to the selection of the position axially to the outside of the strand 612 relative to the carcass reinforcement upturn 10.

The presence of the strand 612 of the second ply 61 of the first bead reinforcement armature 6, of a height greater than the height $H_C$ of the rim flange and the trace of which meets the definition of a shortest-path trace, permits better taking-up of the tensile stresses at the level of the upturn, and consequently permits a reduction in the stresses at the ends of the upturns. Said presence makes it unnecessary to have present an axially outer strand 602 of the first ply 60, the greater height of which is greater than the height of the rim hook: thus the height $H_{LI}$ may also be less than the height $H_C$.

The bead is finished off, in the same way as in the case of the two variants described previously, by a second reinforcement armature 7. Whether it be in the case of the variant of FIG. 2 or the variant of FIG. 3, the structure of the bead according to the invention also comprises a second reinforcement armature 7, also formed of a single ply 7 of inextensible metal cables made of steel which are parallel to each other in the ply and form an angle of 22° with the circumferential direction, said ply 7 being located axially to the outside of the axially outer strand 612 of the second ply 61 of the first bead reinforcement armature 6.

I claim:

1. A tire of height H when on its rim, comprising at least one radial carcass reinforcement, formed of at least one ply of inextensible reinforcement elements and anchored in each bead to a bead wire to form an upturn, the end of which is located at a radial distance $H_{RNC}$ from the base D of the bead wire, each bead being reinforced by at least two additional reinforcement armatures, at least one first armature formed of at least one ply of inextensible radial metallic reinforcement elements and at least one second armature formed of metallic elements which form with the circumferential direction an angle α such that $0°≦α≦45°$, characterized in that, viewed in meridian section, the first ply of the at least one first reinforcement armature is wound around the anchoring bead wire of the at least one carcass reinforcement on the inside of said at least one carcass reinforcement to form two strands, such that the axially inner strand, between the radially lower end A of its radially upper edge adjacent to the carcass reinforcement and its point of tangency T to the anchoring bead wire, follows a rectilinear trace AT, referred to as "shortest-path", and that the radially upper end of said axially inner strand is radially located at a distance $H_{LI}$ from the base D of the bead wire of between 0.216 and 0.432 times the height H, the axially outer strand which is located axially to the inside of the upturn of the at least one carcass reinforcement having its radially upper end radially closer to the axis of rotation than the end of the carcass reinforcement upturn and the distance $H_{LE}$ between said end of the axially outer strand and the base D of the bead wire being between 0.2 and 0.8 times the height $H_{RNC}$ of the upturn of the at least one carcass reinforcement, the at least one second armature not being wound around said anchoring bead wire and arranged axially to the outside of the upturn of the at least one carcass reinforcement.

2. A tire according to claim 1, characterized in that the meridian profile of the at least one carcass reinforcement, starting from a point A' thereof located on the same straight line parallel to the axis of rotation of the tire as A, up to its point of tangency T' with the bead wire, has a trace A'T' which, viewed in cross-section, is parallel to the trace AT of the rectilinear portion of the axially inner strand of the at least one first reinforcement armature.

3. A tire according to claim 1, characterized in that the radial reinforcement elements of the first ply of the at least one first bead reinforcement armature are steel cables.

4. A tire according to claim 3, characterized in that the at least one first reinforcement armature comprises a second ply wound around the bead wire so as to form two strands: one axially outer strand, located axially to the outside of the upturn of the at least one carcass reinforcement and the radially upper end of which is at a radial distance $H_{LE2}$ from the base D of the bead wire of between 0.4 and 1.2 times the distance $H_{RNC}$, the end of the axially inner strand being distant from said base D by a quantity less than the height $H_C$ of the rim flange on which the tire will be mounted.

5. A tire according to claim 4, characterized in that the profile of the axially outer strand of said second ply of the at least one bead reinforcement armature has a "shortest-path" trace which, between its upper end B and its point of tangency T''' with the circle parallel to the circle circumscribed on the bead wire, has a length less than the length of the trace of the meridian profile of the carcass upturn, between that point of said upturn E' which is located on the straight line perpendicular to the meridian profile of the upturn of the carcass reinforcement lowered by B and the point of tangency T''' with the bead wire located on the same straight line parallel to the axis of rotation as the point T''.

6. A tire according to claim 4, characterized in that the at least one second armature is arranged axially to the outside of the axially outer strand of the second ply of the the at least one first bead reinforcement armature.

7. A tire according to claim 4, characterized in that the radial reinforcement elements of the second ply of the at least one first bead reinforcement armature are steel cables.

* * * * *

UNITED STATES PATENT AND TRADEMARK OFFICE
CERTIFICATE OF CORRECTION

PATENT NO. : 6,591,883 B2  Page 1 of 1
DATED : July 15, 2003
INVENTOR(S) : Pascal Auxerre It is certified that error appears in the above-identified patent and that said Letters Patent is hereby corrected as shown below:

Column 2,
Line 16, "Hi[]c" should read -- $H_{RNC}$ --
Line 28, "HLE" should read -- $H_{LE}$ --

Column 8,
Lines 11 and 17, "B" should read -- E --
Line 22, "the" (fourth occurrence) should be deleted Signed and Sealed this Ninth Day of December, 2003

JAMES E. ROGAN
*Director of the United States Patent and Trademark Office*